United States Patent [19]

Koga et al.

[11] Patent Number: 4,839,458
[45] Date of Patent: Jun. 13, 1989

[54] PREPARATION WITH CONTROLLED AMOUNTS OF POLYCARBONATE CARBON TETRACHLORIDE

[75] Inventors: Shinichiro Koga, Nohgata; Akira Matsuno, Kitakyushu; Katsuyuki Sakata; Yoshiaki Ohtani, both of Nakama; Isao Akihara, Kitakyushu, all of Japan

[73] Assignee: Mitsubishi Chemical Industries Ltd., Tokyo, Japan

[21] Appl. No.: 63,001

[22] Filed: Jun. 17, 1987

[30] Foreign Application Priority Data

Jun. 18, 1986 [JP] Japan ............................ 61-142164
Jun. 18, 1986 [JP] Japan ............................ 61-142165
Oct. 3, 1986 [JP] Japan ............................ 61-235829

[51] Int. Cl.$^4$ ............................................. C08G 63/62
[52] U.S. Cl. ................................ 528/196; 524/611; 528/198
[58] Field of Search ............................... 528/196, 198

[56] References Cited

FOREIGN PATENT DOCUMENTS 59-22743 4/1977 Japan .
60-81245 5/1985 Japan .

Primary Examiner—Harold D. Anderson
Attorney, Agent, or Firm—Ernest V. Linek; David G. Conlin

[57] ABSTRACT

Disclosed herein is a process for producing a resin having carbonate bonding, comprising polymerizing a hydroxydiaryl compound and phosgene in an organic solvent of methylene chloride such that the concentration of carbon tetrachloride in phosgene and methylene chloride in the polymerization system satisfies the following equation:

$$A + 5B \leq 200$$

(wherein A represents carbon tetrachloride concentration (ppm) in phosgene and B represents carbon tetrachloride concentration (ppm) in methylene chloride).

10 Claims, No Drawings

PREPARATION WITH CONTROLLED AMOUNTS OF POLYCARBONATE CARBON TETRACHLORIDE

BACKGROUND OF THE INVENTION

The present invention relates to a process for producing a resin having carbonate bonding with no acidic component in pellets or molding products, all with excellent tone. More particularly, it relates to a process for producing a resin having carbonate bonding by using methylene chloride as an organic solvent and phosgene as a starting material, wherein the polymerization is conducted such that the concentration of carbon tetrachloride (CCl$_4$) in the phosgene and methylene chloride in the polymerization system satisfies the following equation:

$$A + 5B^\circ 200,$$

wherein A represents the CCl$_4$ concentration in phosgene (ppm) and B represents the CCl$_4$ concentration in methylene chloride (ppm).

Phosgene usually contains from 250 ppm to 2000 ppm of carbon tetrachloride (CCl$_4$) as disclosed in Japanese Patent Publication No. 55-14044 (1980).

When producing a polymer using phosgene containing such CCl$_4$ as starting material and using methylene chloride as a solvent, most of CCl$_4$ is dissolved in methylene chloride and, as a result, contained in the methylene chloride solution of the polymer.

CCl$_4$ remaining in the polymer solution is distributed between the polymer and the methylene chloride at a ratio corresponding to the separation condition upon separating the polymer and methylene chloride.

Usually, methylene chloride thus separated is used again without separating the CCl$_4$ in industrial recycle processes. Accordingly, the CCl$_4$ concentration in methylene chloride increases as the number of recyclizations is increased. From polymers containing such a halogen compound, acidic components originate upon heating, especially in pelletization and molding, thereby causing a problem of corrosion of the dies in molding machines (the die is corroded during the operation of the molding machine) as disclosed in Japanese Patent Application Laying Open (KOKAI) No. 60-81245 (1985). In this case, mold-die corrosion is prevented by blending a specific ester in with the molding composition.

Further, the quality of the polymer is not quite satisfactory e.g., the tone of pellets or molding pieces is worsened depending on the kind of heat stabilizers used for if an insufficient amount of a heat stabilizers is added. However, it has not yet been recognized at all that this drawback is caused by carbon tetrachloride (CCl$_4$) in the starting phosgene and methylene chloride.

The present inventors have made various studies for preventing the formation of the acidic component upon pelletization and molding of the resultant pellets, as well as for improving the tone of the pellets or molding pieces and, as a result, it has been found that the material mainly contributing to such undesired effects is CCl$_4$ contained in the methylene chloride solution of the polymer, and have derived the present invention based on the finding that a resin having carbonate bonding of excellent quality, generating no acidic components upon pelletization or molding and having favorable tone of pellets and molding pieces can be produced by reducing the CCl$_4$ concentration in the starting phosgene and methylene chloride to below a value as shown by the following formula:

$$A + 5B \leq 200$$

wherein A represents the CCl$_4$ concentration in the phosgene (ppm), and B represents the CCl$_4$ concentration in the methylene chloride (ppm).

That is, one object of the present invention is to provide a resin having carbonate bonding of excellent quality and this object can be attained by adjusting the CCl$_4$ concentration (ppm) in the phosgene and the methylene chloride in the polymerization system so as to satisfy the above-mentioned formula.

SUMMARY OF THE INVENTION

In one aspect of the present invention, there is provided a process for producing a resin having carbonate bonding, comprising polymerizing a dihydroxydiaryl compound and phosgene in an organic solvent of methylene chloride such that the concentration of carbon tetrachloride in phosgene and methylene chloride in the polymerization system satisfies the following equation:

$$A + 5B \leq 200$$

(wherein A represents the carbon tetrachloride concentration (ppm) in the phosgene and B represents the carbon tetrachloride concentration (ppm) in the methylene chloride).

DETAILED DESCRIPTION OF THE INVENTION

For the resin having carbonate bonding of the present invention, there can be mentioned those thermoplastic resins such as polycarbonate, polyester carbonate and polycarbonate carbamate produced by polymerizing a dihydroxydiaryl compound (optionally containing a diamine compound or an acid chloride) using phosgene as the starting material and methylene chloride as the organic solvent.

The polycarbonate resin can include those polymers or copolymers obtained by a phosgene process in which various dihydroxydiaryl compounds and phosgene are reacted, and a typical example thereof is a polycarbonate resin produced from 2,2-bis(4-hydroxyphenyl)propane (bisphenol A).

As the dihydroxydiaryl compounds there may be mentioned, bisphenol A, as well as bis(4-hydroxyaryl)alkanes such as
bis(4-hydroxyphenyl)methane,
1,1-bis(4-hydroxyphenyl)ethane,
2,2-bis(4-hydroxyphenyl)butane,
2,2-bis(4-hydroxyphenyl)octane,
bis(4-hydroxyphenyl)phenylmethane,
1,1-bis(4-hydroxyphenyl)phenylethane,
2,2-bis(4-hydroxy-3-methylphenyl)propane,
1,1-bis(4-hydroxy-3-tert-butylphenyl)propane,
2,2-bis(4-hydroxy-3-bromophenyl)propane,
2,2-bis(4-hydroxy-3,5-dibromophenyl)propane and
2,2-bis(4-hydroxy-3,5-dichlorophenyl)propane;
    bis(hydroxyaryl)cycloalkanes such as
1,1-bis(4-hydroxyphenyl)cyclopentane and
1,1-bis(4-hydroxyphenyl)cyclohexane;
    dihydroxydiaryl ethers such as
4,4'-dihydroxy diphenyl ether and
4,4'-dihydroxy-3,3'-dimethyl diphenyl ether;

dihydroxydiaryl sulfides such as
4,4'-dihydroxydiphenyl sulfide and
4,4'-dihydroxy-3,3'-dimethyl diphenyl sulfide;
dihydroxydiaryl sulfoxides such as
4,4'-dihydroxydiphenyl sulfoxide and
4,4'-dihydroxy-3,3'-dimethyl diphenyl sulfoxide; and
dihydroxy diaryl sulfones such as
4,4'-dihydroxydiphenyl sulfone and
4,4'-dihydroxy-3,3'-dimethyldiphenyl sulfone may be exemplified.

They may be used alone or as a mixture of two or more of them and, in addition, hydroquinone, resorcine, 4,4'-dihydroxydiphenyl may also be used in admixture with the dihydroxydiaryl compounds.

As the polyester polycarbonate resin there may be mentioned, copolymers obtained by the reaction of various dihydroxy diaryl compounds as stated for the polycarbonate resin above, phosgene and acid chloride (terephthalic chloride or isophthalic chloride, etc.) may be exemplified [refer to Japanese Patent Application Laying Open (KOKAI) Nos. 55-25427 (1980) and 55-38824 (1980)].

As the polycarbonate carbamate there may be mentioned, copolymers obtained by the reaction of piperazine (or dipiperidine), dihydroxydiaryl compound and phosgene may be exemplified [refer to Japanese Patent Application Laying Open (KOKAI) No. 60-31527 (1985) and 60-35024 (1985)]. From the above description, it will be understood that the term dihydroxydiaryl compound, as used throughout the specification and claims, is intended to include both individual and mixed dihydroxydiaryl compounds as well as such compounds with optional copolymerizable compounds such as diamine compounds or acid chlorides.

$CCl_4$ is usually present in the starting phosgene at a concentration of from 250 to 2000 ppm as described above. $CCl_4$ is dissolved in methylene chloride used upon production of a polymer and remains in the polymer solution (the polymer concentration in the polymer solution is from 5 to 30% by weight preferably, from 10 to 25% by weight).

$CCl_4$ remaining in the polymer solution is distributed between the polymer and the methylene chloride at a ratio corresponding to the separating condition upon separating the polymer and methylene chloride. Although $CCl_4$ is not usually contained in methylene chloride, since the methylene chloride recovered in industrial processes is used without separating $CCl_4$, the $CCl_4$ concentration in this methylene chloride increases as the number of recycled uses is increased. Further, $CCl_4$ may also be produced upon separating the polymer and methylene chloride if they are heated to a high temperature.

Thus, the undesirable acidic components are formed in the case of pelletizing the polymer produced in methylene chloride containing a great amount of $CCl_4$, upon molding such pellets or from the resultant pellets, causing corrosion of the die in the molding machine. Further, the tone of the pellets or molding pieces are not quite satisfactory.

In view of the above, it is desired that the $CCl_4$ concentration in the polymer solution before separating methylene chloride and the polymer be as low as possible.

As a method of reducing the $CCl_4$ concentration in the polymer solution, there is the method of decreasing the intrusion of $CCl_4$ by the reduction of the $CCl_4$ concentration in the starting phosgene, by which the $CCl_4$ concentration can be reduced to not more than 200 ppm preferably, by not more than 150 ppm.

As a method of removing $CCl_4$ in the starting phosgene, there is the method of removing $CCl_4$ by adsorption on activated carbon, etc. or a method of removal by a distillation separation, utilizing the difference in the boiling point between phosgene and carbon tetrachloride, and either of the methods may be used.

In the case of the distillation removal, sufficient removal can be attained by a single stage distillation or distillation in a plurality of stages and this method is advantageous since satisfactory result can be obtained by a relatively simple device.

Further, as a method of using methylene chloride with low $CCl_4$ content, there is the method of removing $CCl_4$ contained in methylene chloride by applying a distillation operation of the like to a portion or the entire amount of methylene chloride under recycling use in a case where methylene chloride is recycled continuously. Further, as a method of lowering the $CCl_4$ concentration in methylene chloride, there is the method of decreasing the dissolved oxygen concentration in the methylene chloride solution of the polymer in the case of condensation to powderize the methylene chloride solution of the polymer by heating.

The dissolved oxygen concentration in the methylene chloride solution of the polymer in this case is not more than 20 ppm preferably, not more than 10 ppm.

The dissolved oxygen concentration in the methylene chloride solution of the polymer is usually not less than about 30 ppm, in the case of operating in air. The dissolved oxygen in the methylene chloride solution of the polymer is increased by the dissolution of oxygen from air. For instance, polymerization, washing, etc. upon production of a polymer are conducted in an agitation vessel. Further, the methylene chloride or the methylene chloride solution of the polymer in a storage tank is partially sent to the succeeding step while recycling to the storage tank by way of a centrifugal pump. Since a gas phase is present in the agitation vessel or storage tank and it is impossible to operate under a completely air-tight condition, air intruded from the gland portions for the stirring, vent pipes, etc. are dissolved into the methylene chloride solution of the polymer due to the agitation or the liquid recycle.

As the method of decreasing the dissolved oxygen in the methylene chloride solution of polymer, there are the following methods:

(1) a method of using the starting material removed with dissolved oxygen and interrupting external oxygen by conducting all of the production steps in pressurized inert gas atmosphere, (2) a method of removing dissolved oxygen in the methylene chloride solution of the polymer by blowing an inert gas before the concentration and powderization, (3) a method of removing by the addition of a reducing agent, etc.

The method (3) of removing the dissolved oxygen by the addition of the reducing agent is not preferable since the reducing agent, if it is solid or high boiling liquid, may possibly remain in the polymer product, thereby giving an undesired effect on the quality of the product. Further, the method (1) above is also unpreferably since it is difficult to operate under the airtight condition. Then, the method (2) of removing the dissolved oxygen by the blowing of the inert gas is preferred. As the inert gas, there can be mentioned nitrogen gas, argon gas, etc.

For example, in the case where the nitrogen gas is blown at a twice volume of the methylene chloride solution of the polymer into the methylene chloride solution of the polymer before the condensation and powderization, the dissolved oxygen concentration is reduced to about 1/10 and the dissolved oxygen in the methylene chloride solution of the polymer can be removed relatively simply. While the CCl$_4$ may be removed in any of the methods as described above, it is necessary that the CCl$_4$ concentration in the polymerization system be kept within the range defined by the following formula:

$$A + 5B \leq 200$$

wherein A represents CCl$_4$ concentration in phosgene (ppm) and B represents CCl$_4$ concentration in methylene chloride (ppm), preferably $$A + 5B \leq 150$$

and, more preferably, $$A + 5B \leq 100.$$

It is satisfactory that the carbon tetrachloride (CCl$_4$) concentration in the resultant polymer is not more than 20 ppm preferably, not more than 10 ppm.

As the methylene chloride used herein, a mixture of methylene chloride with chlorinated hydrocarbon such as dichlorobenzene, chloroform, tetrachloroethane, trichloroethane, dichloroethane, and 1,2-dichloroethylene, or with dioxane, tetrahydrofuran, acetophenone, toluene, xylene, cyclohexane, acetone or n-heptane may be exemplified. Those mixtures containing not less than 60% of methylene chloride are preferred and, particularly, 100% methylene chloride is most suitable.

As the method polymerizing of the polymer, there can be mentioned an interfacial polymerization of reacting phosgene or phosgene and acid chloride in the presence of a dihydroxydiaryl compound, diamine compound, organic solvent, water and alkali hydroxide, and a solution polymerization of dissolving a hydroxydiaryl compound or a diamine compound, which is reacted with phosgene or phosgene and an acid chloride in the presence of an organic alkali and an organic solvent as an acid acceptor.

The polymer solution after polymerization may be diluted with methylene chloride as required for washing and purification. The polymerization system referred to in the present invention includes the step of polymerizing as described above and, in the case of conducting dilution, a step of dilution as well. Impurities in the polymer solution may be removed by washing with an aqueous alkali solution, an aqueous acid solution, water, etc. Washing is conducted by using a mixer settler, centrifugal extractor or the like.

For the powderization of the polymer solution, the polymer is powderized while heating the polymer solution and removing methylene chloride, or the polymer is deposited by adding a non-solvent or the like.

Since methylene chloride, non-solvent, etc. are contained in the polymer, these solvents are removed by drying under an ordinary method.

Since the powdery polycarbonate obtained according to the present invention generates no acidic components when heated during pelletization or molding, the problem such as corrosion of the die in the molding machine can be eliminated.

Further, since the corrosion of the die is eliminated, operations for eliminating rust deposited in the molding machine are no more necessary upon restarting the molding machine after stopping. While a great amount of polymer has previously been necessary for removing the rust in molding machines, such removal is no longer required and this loss of polymer is decreased.

Further, the tone of the resultant pellets or molding pieces become stable and favorable due to the reduction in the CCl$_4$ concentration thereby enabling to obtain products of substantially satisfactory quality.

The present invention is explained in more detail in the following Examples; however, it should be recognized that the scope of the present invention is not restricted to these Examples.

Examples 1–3 and Comparative Examples 1–3

For removing CCl$_4$ contained in phosgene (concentration: 500 ppm), 2 liter of liquefied phosgene were charged to a 3 liter flask and subjected to rectification for 4 hours by using a Widmer rectification pipe at a column temperature of 8° C. and a reflux ratio of 1:1.

As a result, the CCl$_4$ concentration in the phosgene was 5 ppm (1.66 kg) at the top, and 1200 ppm (1.17 kg) at the bottom of the column.

Polycarbonate was prepared by using the thus resultant phosgene at the column top in accordance with an ordinary method [refer to Japanese Patent Application Laying Open (KOKAI) No. 61-14227 (1986)]. That is 15.3 liter of purified water, 1.03 kg (25.7 mol) of sodium hydroxide, 3.0 g of sodium hydrosulfite and 2,790 g (12.2 ml) of bisphenol A were successively added under stirring to and completely dissolved in a 25 liter glass-lined vessel equipped with buffle plates and having a stirrer, a phosgene blowing tube, a thermometer and a drain cock disposed at the bottom portion.

Then, 3.1 liter (7.65 mol) of an aqueous 10 wt/vol % sodium hydroxide solution and 7.65 liter of methylene chloride (CCl$_4$ concentration: 5 ppm) were added, 1.38 kg (13.9 mol) of phosgene was blown under stirring for 60 minutes while keeping the liquid temperature at 20° C. by external cooling and, thereafter, 66.7 g of para-tert-butylphenol and 3.1 g of triethylamine were added, stirred for one hour and polymerized.

After the completion of the polymerization and washing the organic phase in the lower layer with purified water for once, 3.0 liter of 10% phosphoric acid was added for neutralization, washed with purified water for three times and heated to distill off methylene chloride to obtain a powdery polycarbonate.

The powdery polycarbonate was dried by an ordinary method and, thereafter, kneaded into pellets with no addition of additives such as heat stabilizer in a 20 mm$\phi$ extruder (manufactured by Tanabe Plastic Co.) (kneading temperature: 280° C., number of screw rotation: 40 rpm, kneading rate: 1.6 kg/Hr, polymer staying time: 2 min).

The resultant pellet was in the shape of 1.3 mm$\phi$ and 2.5 mmL (length).

The pellets were dried by an ordinary method and YI (yellow index) was measured by a color difference meter (Model TC-55D, manufactured by Tokyo Denshoku Co.). As a result, the pellet had satisfactory YI of 6.

Measurement in the metal corrosion test was conducted by the method described below.

After molding 200 sheets of flat plates each sized 7 cm length, 4 cm width and 3.2 mm thickness by injection molding (molding temperature 300° C.) using molding dies made of carbon steel (S55C), the molding dies after use were left at room temperature for 24 hours and the surface state of them were evaluated by visual observation. The ratings for the evaluation are as below:

| Evaluation 0: | with no rust |
| Evaluation 1: | point-corrosion occurred |
| Evaluation 2: | brown rust resulted partially |
| Evaluation 3: | brown rust formed entirely |

Evaluation result for the corrosion of the dies in those examples was satisfactory with no occurrence of rust. (It is necessary for practical use that the evaluation result for the corrosion is "0".)

Further, measurement was also conducted for the pellets obtained by adding $CCl_4$ (guaranteed reagent, manufactured by Wako Junyaku Co.) to phosgene and-/or methylene chloride so as to provide $CCl_4$ content as shown in Table 1 below and conducting polymerization in the same manner as above. Further, measurement was also conducted for the case where the $CCl_4$ concentration in phosgene was 200 ppm using fresh methylene chloride ($CCl_4$ concentration (B)=0). The results are as shown in Table 1 below.

For the comparison, the result in a case where the value of A+5B exceeds 200 ppm is also shown together.

TABLE 1

| | $CCl_4$ concentration (ppm) | | | Die corro- sion test | Pellet tone YI |
|---|---|---|---|---|---|
| | in phosgene (A) | in methylene chloride (B) | A + 5B | | |
| Example 1 | 5 | 5 | 30 | 0 | 6 |
| Example 2 | 10 | 20 | 110 | 0 | 7 |
| Example 3 | 50 | 20 | 150 | 0 | 8 |
| Example 4 | 200 | 0 | 200 | 0 | 8 |
| Comparative Example 1 | 50 | 50 | 300 | 1 | 11 |
| Comparative Example 2 | 50 | 110 | 600 | 2 | 15 |
| Comparative Example 3 | 500 | 20 | 600 | 2 | 15 |

EXAMPLE 5

For removing $CCl_4$ contained in phosgene (concentration: 500 ppm), 2 liter of liquefied phosgene were charged to a 3 liter flask and subjected to rectification by using a Widmer rectification pipe, at a column temperature of 8° C. and a reflux ratio of 1:0.5.

As a result, the $CCl_4$ concentration at 50 ppm in phosgene was obtained at the column top.

A polycarbonate was produced by using the thus obtained phosgene in the same procedures as those in Example 1 except for using methylene chloride containing $CCl_4$ concentration at 10 ppm.

After the completion of the polymerization, 10.1 liter of methylene chloride prepared by adding $CCl_4$ to methylene chloride containing no $CCl_4$ so as to adjust the $CCl_4$ concentration to 10 ppm was added to the organic phase in the lower layer. After washing once with purified water, 3.0 liter of 10% phosphoric acid was added for neutralization and, after washing with purified water for three times, methylene chloride was distilled off by heating to obtain powdery polycarbonate.

The distilled methylene chloride was collected by cooling and 95% of the charged methylene chloride was recovered. 10% of the thus recovered methylene chloride was distilled off to reduce the $CCl_4$ concentration in methylene chloride to not more than 2 ppm. The recovered methylene chloride, the distilled methylene chloride and supplementary methylene chloride (methylene chloride corresponding to 5% of the charged methylene chloride prepared from methylene chloride containing no $CCl_4$ and adjusted 10 ppm by adding $CCl_4$) were mixed and used as methylene chloride for polymerization and washing.

When the procedures of polymerization, washing and powderization were conducted for six times, $CCl_4$ in the recovered methylene chloride substantially reached equilibrium at fifth operation to 8 ppm. The resultant powdery polycarbonate obtained by recycling methylene chloride for six times was dried by an ordinary method and kneaded with no addition of additives such as heat stabilizers in a 20 mm$\phi$ extruder (manufactured by Tanabe Plastic Co.) into pellets (kneading temperature: 280° C., screw rotational number: 40 rpm, kneading rate: 1.6 kg/Hr, polymer staying time: 2 min).

The resultant pellets were in the shape of 1.3 mm$\phi \times$ 2.5 mmL (length). The pellets were dried by an ordinary method and YI and mold die corrosion tests were carried out in the same manner as in Example 1.

The results are shown in Table 2 below.

EXAMPLES 6, 7

Starting phosgene was prepared by adding carbon tetrachloride ($CCl_4$) to a column top solution obtained in the same procedures as in Example 5 (a column top solution prepared by distillation in a Widmer rectification pipe for removing $CCl_4$ in phosgene) so as to attain the $CCl_4$ concentration in phosgene as shown in Table 2 below.

Further, a solvent was prepared by adding carbon tetrachloride to methylene chloride containing no $CCl_4$ so as to adjust the $CCl_4$ concentration in methylene chloride as shown in Table 2 below.

Polymers were prepared by the same procedures as in Example 5 by using the phosgene and methylene chloride adjusted with the carbon tetrachloride ($CCl_4$) concentration. A predetermined amount of the recovered methylene chloride was used recyclically after distillation and, when the $CCl_4$ concentration in the recovered methylene chloride reached an equilibrium, the die corrosion by the resultant polymer and the pellet tone were evaluated.

The results are shown in Table 2 below. Satisfactory results were obtained for the die corrosion evaluation and the pellet tone in the case where the value A+5B is not more than 200. In the formula, A represents $CCl_4$ concentration in phosgene (ppm) and B represents $CCl_4$ concentration in methylene chloride (ppm).

COMPARATIVE EXAMPLES 4–6

Polymers were prepared by the same procedures as those in Example 5 while varying the concentration of $CCl_4$ in phosgene and the $CCl_4$ concentration in methylene chloride being used recyclically. A predetermined amount of the recovered methylene chloride was used recyclically after distillation and, when the $CCl_4$ concentration in the recovered methylene chloride reached an equilibrium, the die corrosion of the resultant polymer and the pellet tone were evaluated.

As a result, no satisfactory results can be obtained for the evaluation of the die corrosion and pellet tone in the case where the value for A+5B exceeded 200. The results are also shown in Table 2.

TABLE 2

| | Distillation ratio for recycled methylene chloride (%) | CCl₄ concentration | | A + 5B (ppm) | Die corrosion test | Pellet tone YI |
|---|---|---|---|---|---|---|
| | | Starting phosgene (A) (ppm) | Recycled methylene chloride | | | |
| | | | Initial value (ppm) | Equilibrium value (B) (ppm) | | |
| Example 5 | 10 | 50 | 10 | 8 | 90 | 0 | 7 |
| Example 6 | 10 | 70 | 10 | 10 | 120 | 0 | 7 |
| Example 7 | 30 | 100 | 10 | 8 | 140 | 0 | 8 |
| Comparative Example 4 | 10 | 100 | 15 | 38 | 290 | 1 | 11 |
| Comparative Example 5 | 10 | 200 | 100 | 71 | 555 | 2 | 13 |
| Comparative Example 6 | 5 | 200 | 100 | 123 | 815 | 3 | 19 |

EXAMPLE 8

To the same glass lined vessel in Example 1, 15.3 liter of purified water, 1.03 kg (25.7 mol) of sodium hydroxide, 3.0 g of sodium hydrosulfide and 2,790 g (12.2 mol) of bisphenol A were successively added and dissolved completely under stirring.

Then, 3.1 liter (7.65 mol) of an aqueous 10 wt/vol % of sodium hydroxide solution and 7.65 liter of methylene chloride were added and 1.38 kg (13.9 mol) of phosgene was blown under stirring for 60 min while keeping the liquid temperature at 20° C. by external cooling. Then, 66.7 g of para-tert-butylphenol and 3.1 g of triethylamine were added and polymerized by stirring for one hour.

After the completion of the polymerization, 14.1 liter of methylene chloride was added to the organic phase in the lower layer and washed with purified water for once. Then, 3.0 liter of 10% phosphoric acid was added for neutralization and washed with purified water for three times to obtain a purified methylene chloride solution.

When analyzing the 10% methylene chloride solution a the polymer (15 liter), the dissolved oxygen concentration was 30 ppm and the CCl₄ concentration was 5 ppm.

when the dissolved oxygen concentration was measured after blowing a nitrogen gas at 6.0 liter/min for 10 min into the polymer solution, it was 0 ppm. The solution was charged in a nitrogen-substituted 20 liter volume autoclave made of stainless steels (SUS-316) and maintained at 180° C. for 2 hours with no stirring.

After heat treatment, it was cooled to an ambient temperature and the CCl₄ in the methylene chloride solution of the polymer was quantitatively determined to be 5 ppm by gas chromatography (GC7A manufactured by Shimazu Seisakusho).

The polymer solution of the methylene chloride was heated again and methylene chloride was distilled off to obtain a powdery polycarbonate.

The powdery polycarbonate was dried in an ordinary manner and kneaded into pellets with no addition of additives such as heat stabilizer in a 20 mmφ extruder (manufactured by Tanabe Plastic Co.) (kneading temperatures: 280° C., number of screw rotation: 40 rpm, kneading rate: 1.6 kg/Hr, polymer staying time: 2 min).

The resultant pellets were in the form of shape of 1.3 mmφ and 2.5 mmL (length).

The pellets were dried by an ordinary method and YI (yellow index) was measured by a color difference meter (Model TC-55D, manufactured by Tokyo Denshoku Co.).

As a result, the pellets had a satisfactory YI value of 6.

EXAMPLE 9

Dissolved oxygen was removed from the 10 wt % methylene chloride solution of the polymer prepared in the same procedures as in Example 8 by blowing a nitrogen gas at 6.0 liter/min for 4 minutes. The dissolved oxygen concentration was 5 ppm. The methylene chloride solution of the polymer was charged in a 20 liter autoclave made of stainless steel and substituted with nitrogen gas and maintained at 180° C. for 2 hours with no stirring in the same manner as in Example 8.

As a result, the CCl₄ concentration in the methylene chloride solution of the polymer after the heat treatment was 16 ppm. When the polymer solution of the methylene chloride was powderized and kneaded in an extruder, the pellet had YI value of 7.

EXAMPLE 10

Dissolved oxygen was removed from the 10 wt % methylene chloride solution of the polymer prepared in the same procedures as in Example 8 by blowing a nitrogen gas at 6.0 liter/min for 2 minutes. The dissolved oxygen concentration was 10 ppm. The methylene chloride solution of the polymer was charged in a 20 liter autoclave made of stainless steels and substituted with nitrogen gas and maintained at 180° C. for 2 hours with no stirring in the same manner as in Example 8.

As a result, the CCl₄ concentration in the methylene chloride solution of the polymer after the heat treatment was 25 ppm. When the polymer solution of the methylene chloride was powderized and kneaded in an extruder, the pellet had a YI value of 8.

COMPARATIVE EXAMPLE 7

The methylene chloride solution of 10 wt % of polymer concentration and 30 ppm of dissolved oxygen concentration prepared in the same procedures as in Example 8 was charged in a 20 liter autoclave made of stainless steels (not substituted with nitrogen) used in Example 8 and maintained at 180° C. for 2 hours with no stirring).

As a result the CCl₄ concentration in the methylene chloride solution of the polymer after heat treatment was 65 ppm and the pellets obtained by powderizing and drying the polymer solution and then kneading in an extruder had a poor YI value of 13.

The foregoing results are collectively shown in Table 3 below.

TABLE 3

| | Heat treatment temperature (°C.) | Dissolved oxygen density (ppm) | CCl₄ in methylene chloride solution CCl₄ | | Pellet tone YI |
| --- | --- | --- | --- | --- | --- |
| | | | before heat treatment (ppm) | after heat treatment (ppm) | |
| Example 8 | 180 | 0 | 5 | 5 | 6 |
| Example 9 | " | 5 | " | 16 | 7 |
| Example 10 | " | 10 | " | 25 | 8 |
| Comparative Example 7 | " | 30 | " | 65 | 13 |

What is claimed is:

1. A process for producing a resin having carbonate bonding, comprising polymerizing a dihydroxydiaryl compound and phosgene containing carbon tetrachloride in an organic solvent of methylene chloride such that the concentration of carbon tetrachloride in the phosgene and methylene chloride satisfies the following equation:

$$A + 5B \leq 200$$

wherein A represents the ppm carbon tetrachloride concentration in the phosgene and B represents the ppm carbon tetrachloride concentration in the methylene chloride.

2. A process according to claim 1, wherein the starting phosgene is a phosgene containing not more than 200 ppm of carbon tetrachloride concentration.

3. A process according to claim 1, wherein the methylene chloride is recycled in the polymerization process.

4. A process according to claim 1 or 2, wherein the carbon tetrachloride concentration in the starting phosgene is reduced by distillation of the phosgene.

5. A process according to claim 3, wherein the carbon tetrachloride concentration in the methylene chloride is reduced by distilling the methylene chloride prior to recycling.

6. A process according to claim 1, wherein the carbon tetrachloride concentration in the methylene chloride is reduced by decreasing any dissolved oxygen in the methylene chloride solution to a concentration of not more than 20 ppm before distilling the methylene chloride to separate the resin.

7. A process according to claim 6, wherein the dissolved oxygen concentration is reduced to not more than 20 ppm by blowing an inert gas into said methylene chloride solution.

8. A process according to claim 1, wherein the resin having carbonate bondings is a polycarbonate.

9. A process according to claim 1, wherein the carbon tetrachloride concentration in the resultant resin having carbonate bondings is not more than 20 ppm.

10. A process according to claim 9, wherein the carbon tetrachloride concentration in the resultant resin having carbonate bondings is not more than 10 ppm.

* * * * *

UNITED STATES PATENT AND TRADEMARK OFFICE
CERTIFICATE OF CORRECTION

PATENT NO. : 4,839,458

DATED : June 13, 1989

INVENTOR(S) : Shinichiro Koga, et al.

It is certified that error appears in the above-identified patent and that said Letters Patent is hereby corrected as shown below:

Title page, Number 54, Col. 1, lines 2-4, change title from "Preparation With Controlled Amounts of Polycarbonate Carbon Tetrachloride" to --Polycarbonate Preparation With Controlled Amounts of Carbon Tetrachloride (as amended) --

Signed and Sealed this

Twenty-second Day of May, 1990

Attest:

HARRY F. MANBECK, JR.

*Attesting Officer*     *Commissioner of Patents and Trademarks*